United States Patent [19]

LaForce

[11] 4,418,860

[45] Dec. 6, 1983

[54] CLAMPING METHOD AND APPARATUS FOR SOLID PHASE WELDING

[75] Inventor: Jean LaForce, Inverness, Calif.

[73] Assignees: Carl Stringer, Pearland; Stringer Oil and Gas Company, Inc., San Angelo; Carl T. Stringer, Houston, all of Tex.

[21] Appl. No.: 278,488

[22] Filed: Jun. 29, 1981

[51] Int. Cl.³ .............................................. B23K 37/04
[52] U.S. Cl. .................................. 228/196; 228/212; 228/44.5
[58] Field of Search ...................... 228/44.5, 49 B, 50, 228/212, 196; 219/161

[56] References Cited

U.S. PATENT DOCUMENTS

| Re. 28,190 | 10/1974 | LaForce et al. | 219/161 X |
| 3,400,872 | 9/1968 | Rogers | 228/44.5 |
| 3,570,109 | 3/1971 | Harlan et al. | 228/50 |
| 3,644,977 | 2/1972 | Valentine | 228/44.5 |
| 3,741,457 | 6/1973 | Guin et al. | 228/44.5 |

Primary Examiner—Kenneth J. Ramsey
Attorney, Agent, or Firm—Harris Zimmerman; Howard Cohen

[57] ABSTRACT

A method and apparatus for solid phase welding of pipes. A first internal clamping mechanism is employed substantially immediately adjacent the end of each pipe to urge each end into circumferential accuracy. A second internal or external clamping mechanism is employed in axial spaced relation to the first mechanism and which bears upon a greater surface of the pipe than the first mechanism, and is utilized to urge the two pipe ends together so that in combination with the application of heat, a pressure weld, joining the pipe ends, is effected.

7 Claims, 13 Drawing Figures

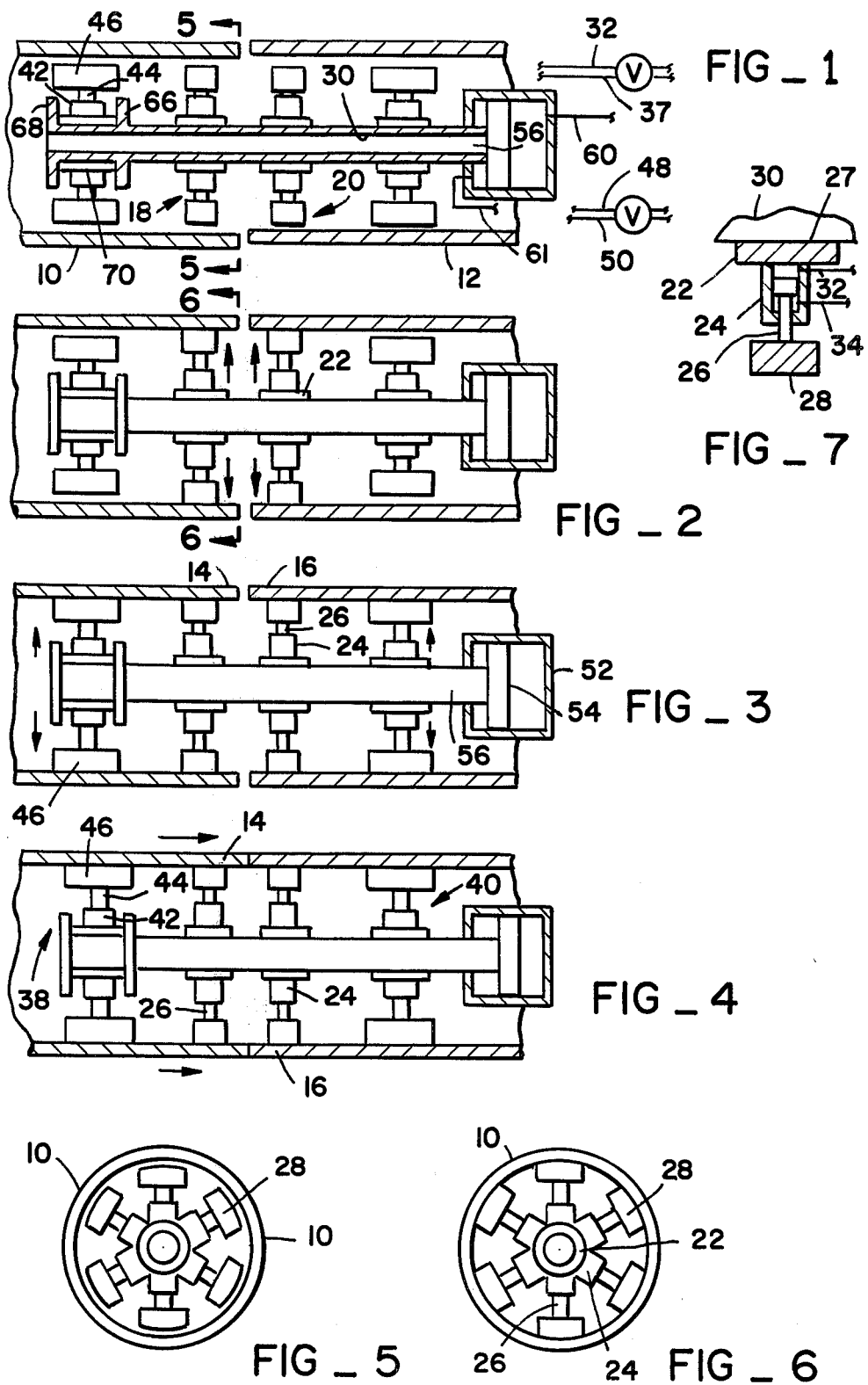

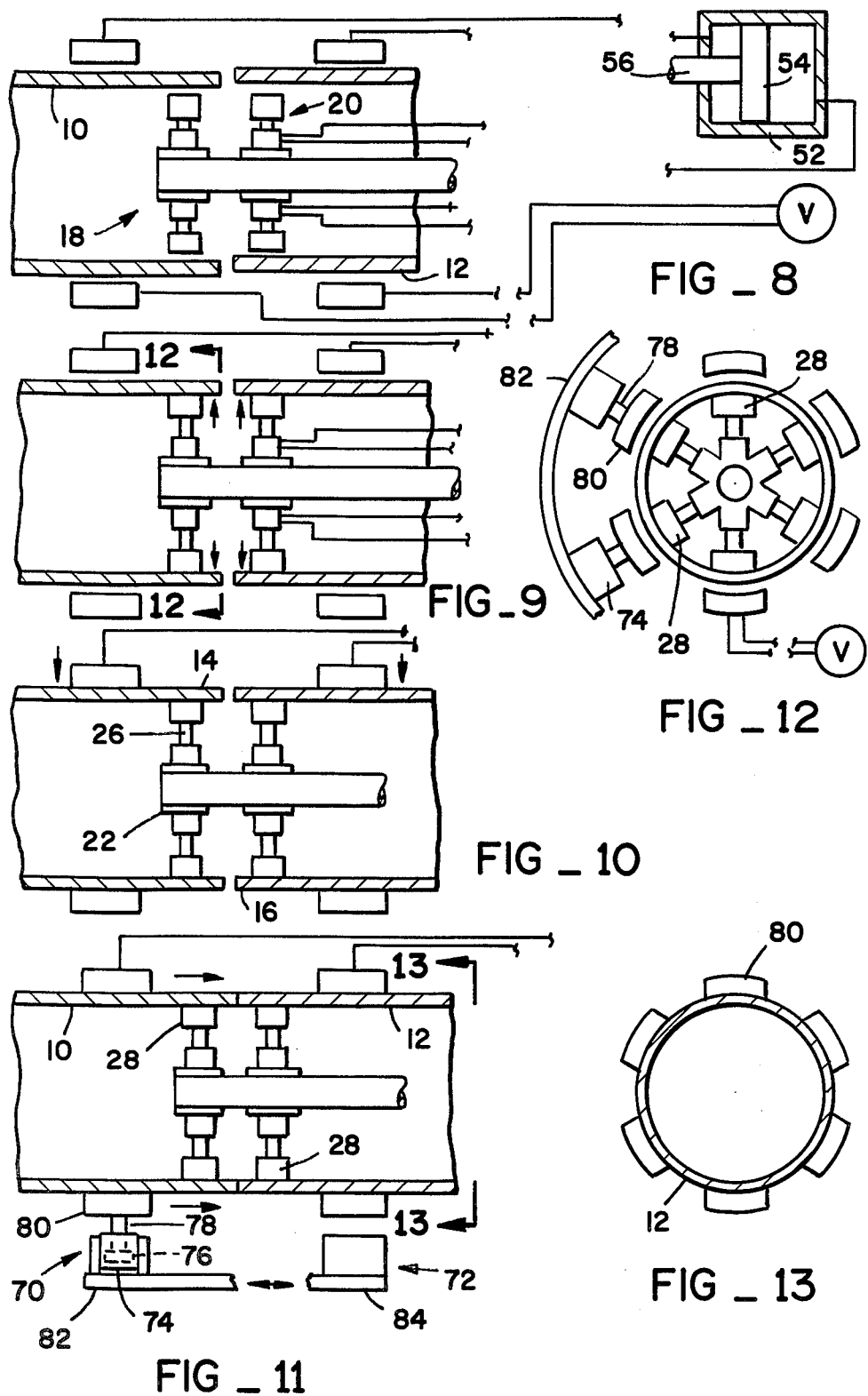

CLAMPING METHOD AND APPARATUS FOR SOLID PHASE WELDING

BACKGROUND OF THE INVENTION

A method and apparatus for solid phase welding of pipes is disclosed in U.S. Pat. No. Re. 28,190, dated Oct. 8, 1974, in which I am co-inventor. A study of such patent, which is particularly pertinent as exemplifying relevant prior art, discloses a method and apparatus for joining adjacent ends of pipes together by means of solid phase or pressure welding.

In more detail, such a system utilizes heating the adjacent pipe ends and physically urging the pipe ends towards each other to create an upset pressure at the pipe ends. An suggested in said patent, the mechanism for effecting the axial translation of the respective pipes includes a plurality of internal pressure pads which are disposed internally at each pipe end, and which are also moveable radially against the inner surface of the pipe so as to forcibly clamp the pipe. Such a mechanism was actually intended to serve three functions; the first being to bring each pipe end into circular shape; the second being to place the two pipe ends in axial alignment; and the third being to act as the vehicle for axially urging the pipe ends together.

Subsequent study and experimentation has indicated that the first function listed above is best served if the pads are relatively short, as measured along the axis of the pipe, while the third function is enhanced by increasing the axial extent of the pads, so as to provide a better frictional grip as the extremely large upset pressure is applied.

SUMMARY OF THE INVENTION

The present invention utilizes the solid phase welding techniques as generally disclosed in the above identified patent, and more particularly is directed to the pipe clamping arrangement.

One object of this invention is to provide a first clamping mechanism adapted for insertion within each of a pair of confronting pipe ends, such mechanism including a plurality of pressure pads which are radially expandable to forcibly bear against the bore of the pipes substantially immediately adjacent their confronting ends; the pads having a relatively short axial extent so that upon actuation of the mechanism, the pipe ends will overcome any pipe irregularities and assume a desired circular configuration, and the pipe ends will be subsequently brought into axial alignment for welding.

Another object of the invention is to provide a second independent clamping mechanism disposed in axially spaced relation to the first clamping mechanism, i.e., axially inwardly of the pipe end. Such a second mechanism is utilized to urge the pipe ends towards each other with sufficient axial upset pressure so that if heat is simultaneously applied to the pipe ends, a pressure welding of the pipes can be accomplished. The second clamping mechanism can be disposed either internally or externally of the pipes. The mechanism may include a plurality of pressure pads which are radially expandable to forcibly bear against the bore or outer surface of the pipes, and which have a sufficient axial extent to provide a sufficiently large friction bearing interface with the pipe to minimize slippage upon application of an axial load.

A BRIEF DESCRIPTION OF THE DRAWING

FIG. 1 is a sectional view taken at a plane through two axially adjacent pipes into which two mechanisms have been operatively inserted, the first mechanism for bringing the pipe ends into circular accuracy and into axial alignment, and the second mechanism for effecting axial translation of the pipes towards each other.

FIG. 2 is a view similar to FIG. 1 in which the first mechanism has been operated.

FIG. 3 is a view similar to FIG. 1 in which the second mechanism has been initially activated to grasp the pipes.

FIG. 4 is another view similar to FIG. 1 in which the second mechanism has been further operated to bring the pipe ends into forcible pressure contact.

FIG. 5 is a cross-sectional view taken in the plane indicated by line 5—5 of FIG. 1.

FIG. 6 is a cross-sectional view taken in the plane indicated by line 6—6 of FIG. 2.

FIG. 7 is an enlarged view of a portion of the mechanism shown in FIG. 1.

FIGS. 8 through 11 generally correspond to FIGS. 1 through 4, but show a modified form of the invention.

FIG. 12 is a cross-sectional view taken in the plane indicated by line 12—12 of FIG. 9.

FIG. 13 is a cross-sectional view taken in the plane indicated by line 12—12 of FIG. 11.

DESCRIPTION OF THE PREFERRED EMBODIMENT

FIGS. 1 through 7 of the drawings illustrate one embodiment of the invention wherein both of the clamping mechanisms are disposed internally and within the two sections of pipe 10 and 12, whose ends 14 and 16 are to be pressure welded together. As illustrated in FIG. 1, the ends 14 and 16 are not necessarily perfectly circular and/or may not be in proper axial alignment, both circular regularity and axial alignment being desirable for effecting a good weld.

The first clamping mechanism includes a pair of axially spaced radially expandable units 18 and 20, each positioned adjacent a pipe end. The two units are substantially the same and include an annular element 22 from which a plurality of radially extending cylinders 24 extend at equal circumferential spacing. A piston 26 is disposed in each cylinder and terminates in a pressure pad 28 having a relatively short axial extent. The annular elements 22 are disposed around an axially extending tubular member 30 and spaced portions of each cylinder 24 are connected by hydraulic lines 32, 34, so that by directing fluid flow through the respective lines to opposite sides of a piston head 217, the pistons may be moved from their inward inoperative position shown in FIGS. 1 and 5 with the pads 28 spaced from the pipe bore to their operative position shown in FIGS. 2 and 6 in which the pads 28 are forceably urged against the respective pipe bores substantially immediately adjacent the pipe ends 14 and 16. Since the pumping mechanism does not comprise any part of this invention and is well known in the art, no details of such mechanism are disclosed in this application. It is sufficient to understand that when the pistons and their attached pressure pads 28 are forced radially outwardly, the pipe ends will be circumferentially trued, and the ends brought into axial alignment, as shown in FIG. 2.

Preferably the pads 28 do not extend for more than about 4 inches in axial length, since the larger the pads, the greater the difficulty in truing the pipe ends into circular configuration.

With the pipe ends circularly true and in axial alignment through the operation of units 18 and 20, it is next necessary to forceably urge the pipe ends towards each other to create the required axial force to effect the pressure weld. It will be understood that in pressure welding, heat is also applied to the joint, as disclosed in Re. 28,190. Such heat would also be utilized here, but to avoid complicating the drawings, the heating apparatus which may be of the type disclosed in Re. 28,190 is not illustrated.

To effect the movement of the pipe ends towards each other, a second pair of axially spaced and radially expandable units 38 and 40 are provided. Each unit is spaced inwardly of its associated clamping unit 18 and 20, i.e., axially inwardly relative to the respective pipe end. Each unit includes a plurality of radially extending cylinders 42, each carrying a piston 44, whose distal end is provided with a pressure pad 46, in an arrangement very similar to the units 18 and 20. Hydraulic lines 48, 50 connected to a source of pressurized fluid control axial extension and retraction of the pistons and their attached pads. When the unit is first inserted into the pipes, the pistons are retracted and the pads radially spaced from the bores of the pipes, as shown in FIGS. 1 and 2. When the pistons 44 are extended, the pads 46 are forced outwardly into forceable engagement with the pipe bores, as shown in FIGS. 3 and 4.

After the pads 46 are forceably and frictionally engaged with the pipes, the units 38 and 40 are caused to move relatively towards each other as shown in FIG. 4. This can be accomplished by means of an hydraulic cylinder 52 suitably anchored in pipe 12 having a piston 54 and a piston rod 56 disposed within the tubular element 30 and whose end is secured to unit 38 so that as the piston is actuated by means of pressurized fluid through lines 60 and 61 leading to opposite sides of the piston, the rod may be moved axially and the clamping unit 38 moved to the right (as viewed in the drawings), causing the pipe 10 to be moved towards and against the pipe 12.

A tremendous force is required to effect pressure welding, and even with the pads 46 hydraulically forced against the pipes, it is essential that sufficient friction is created between the pads 46 and the pipes to permit axial pipe movement without undue slippage between the pads and the pipes. It is for this reason that the pads 46 must be substantially greater in axial extent that the pads 28, whose axial extent is limited by their intended purpose to bring the pipe ends into round. By way of example, the pads 46 might be double the length of the pads 28, or about 8 inches, or even longer.

The connection between the piston rod 56 and the unit 38 is preferably effected by means of annular flanges 66 and 68 disposed on opposite sides of the cylinders 42 of unit 38, and which engage the opposite edges of a collar 70 rotatably encircling piston rod 56. Thus, as piston rod 56 is reciprocated, unit 38 will be moved to the right or to the left as viewed in the drawings. Movement to the left would be when the pads 46 are retracted, and movement to the right would be after the pads 46 are radially expanded and clamped against the bore of pipe 10.

In FIGS. 8 through 13, a modified form of the invention is disclosed. In this latter embodiment, the pipe end engaging units 18 and 20 are the same as in the first described embodiment, and operate in the same fashion for performing the same functions.

However, with respect to the units 38 and 40, these are modified by removing them from the interior of the pipes and mounting the same on the exterior of the pipes. As here shown, units 70 and 72 are disposed in encircling engagement with pipes 10 and 12, and each including a cylinder 74, a piston 76, a piston rod 78, and a pressure pad 80 connected to the distal end of the piston. Actuation or extension of the piston toward the pipe causes the clamping of pads 80 against the exterior of the pipe walls, and actuation of piston 54 within one or more cylinders 52 causes movement or unit 70 towards unit 72 to effect the offset welding pressure. Such axial motion may be imparted to an annular ring 82 encircling and connected to the cylinders of unit 70, and a similar ring 84 encircling and connected to the cylinders of unit 72. Ring 82 and/or ring 84 may be connected to the piston 54 for moving the rings and units selectively from and towards each other.

Here again, the axial extent of pads 80 is substantially greater than that of pads 28 for the reasons above mentioned.

I claim:

1. A method of solid phase welding adjacent ends of axially aligned pipes which include placing the ends of two pipes into substantially axial alignment and into adjacent relationship, placing within each pipe substantially immediately adjacent its end a first plurality of circumferentially spaced pipe bore engaging pads secured to a first set of radially extensible elements, effecting radial outward pressure on said elements causing said first pads to exert like pressure on said pipe adjacent its end and causing such end to assume a circular configuration, said first pads having a first dimension extending axially of said pipe, placing a second set of radially extensible elements axially inwardly of said first set adjacent the wall of each pipe, said second set of elements having pipe engaging pads secured to said second set of radially extensible elements, with said second pads having a second dimension extending axially of said pipe substantially greater than said first dimension, effecting radial pressure on said second elements causing said second pads to clamp the wall of its associated pipe, and then moving at least one group of said second elements axially inwardly and towards the other group of said second elements to bring said pipe ends into forcible engagement.

2. A method as set forth in claim 1 in which said pipes are engaged by said first pads only immediately adjacent their respective confronting ends to facilitate bringing the pipe ends into circular configuration, and in which said pipes are engaged by said second pads for a substantially greater extent so as to prevent slippage between said second pads and said pipes when the groups of said second pads are moved axially towards each other.

3. A method as set forth in claim 1 in which said second set of elements and associated pads are positioned exteriorly of its associated pipe.

4. A method as set forth in claim 1 in which said second set of elements and associated pads are positioned interiorly of its associated pipe.

5. A method as set forth in claim 4 in which said first and second sets of elements and pads are mounted on a common axis for bringing said pipes into axial alignment upon radial outward movement thereof.

6. A method as set forth in claim 1 in which said second dimension is substantially twice as great as said first dimension.

7. A method as set forth in claim 1 in which hydraulic pressure is utilized to effect the said radial and axial movements of said elements.

* * * * *